(12) United States Patent
Li

(10) Patent No.: US 8,950,927 B2
(45) Date of Patent: Feb. 10, 2015

(54) FRAME STRUCTURE AND BACKLIGHT MODULE

(75) Inventor: Dehua Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 86 days.

(21) Appl. No.: 13/522,495

(22) PCT Filed: May 7, 2012

(86) PCT No.: PCT/CN2012/075124
§ 371 (c)(1),
(2), (4) Date: Jul. 16, 2012

(87) PCT Pub. No.: WO2013/163819
PCT Pub. Date: Jul. 11, 2013

(65) Prior Publication Data
US 2013/0294051 A1      Nov. 7, 2013

(30) Foreign Application Priority Data

May 2, 2012  (CN) .......................... 2012 1 0133353

(51) Int. Cl.
*F21V 7/04*   (2006.01)
(52) U.S. Cl.
USPC ............................................ 362/633; 362/632
(58) Field of Classification Search
USPC .................................................. 362/632–633
See application file for complete search history.

(56) References Cited

U.S. PATENT DOCUMENTS

2008/0100770 A1* 5/2008 Chen et al. ........................ 349/58
2008/0123336 A1* 5/2008 Arita et al. ...................... 362/257

* cited by examiner

*Primary Examiner* — Sean Gramling

(57) ABSTRACT

The present invention relates to a frame structure and a backlight module. The frame structure comprises four subframes, retaining holes arranged on a side of a back plate, and fixing parts; each of the subframes has an inner side formed with at least one retaining part; the corresponding subframe is fixed on the side of the back plate by matching the retaining hole with the corresponding retaining part. The frame structure and the backlight module of the present invention can lower manufacturing cost and enhance the assembly/disassembly efficiency of the frame.

11 Claims, 4 Drawing Sheets

FRAME STRUCTURE AND BACKLIGHT MODULE

FIELD OF THE INVENTION

The present invention relates to the field of the liquid crystal display, and more particularly to a low-cost, easy-detachable frame structure and a backlight module.

BACKGROUND OF THE INVENTION

With the rapid progress and development of display technology, the traditional cathode ray tube (CRT) is phased out gradually due to bad space utilization and huge power consumption and replaced by the compact and light liquid crystal display (LCD). Because LCD comprises advantages, such as high display quality, low power consumption and non-radiation, it is considerably applied to communication, information or consumer electronics, such as laptop, mobile phone, personal digital assistant (PDA), digital video camera, digital camera and liquid crystal television.

Mostly, LCD comprises two parts: the backlight module and the liquid crystal panel. The main function of the backlight module is to provide an uniform surface light source to the liquid crystal panel. The backlight module comprises a light guide plate, a light source, a frame (i.e. housing) and a back plate, wherein the light guide plate has an incident plane, and the light source is arranged on one side of the incident surface; the light emitted from the light source passes the incident surface and then emits into the light guide plate, and then emits out of the light guide plate after scattering and reflecting in the light guide plate. The frame is used to fix the light guide plate and the light source on the back plate, so that the light from the emission surface of the light guide plate can irradiate the liquid crystal panel which is arranged on the frame.

The frame is generally fixed on the back plate by fasteners or screws, in order to suitably fix the light guide plate and the light source. For large-size LCD, in order to guarantee the reliable fixation, it requires more fasteners or screws. However, fasteners are easily broken. Too many broken fasteners may cause the whole frame to be defective; meanwhile, using fasteners or screws to fix the frame is adverse to the assembly and disassembly of the frame, resulting in the high cost and low efficient assembly and disassembly of the frame.

Therefore, it is necessary to provide a frame structure and a backlight module to solve the problems of the traditional technology.

SUMMARY OF THE INVENTION

The purpose of the present invention is to provide a frame structure and a backlight module, which arranges retaining parts on subframes and retaining holes on the corresponding position of the back plate, wherein the subframe and the back plate are connected to each other by matching the retaining part with the retaining hole, so as to reduce the production cost and improve the efficiency of the assembly and disassembly of the frame. Thus it solves the traditional problems of high manufacturing cost and low assembly/disassembly efficiency of the frame To solve the problems mentioned above, the present invention provides technical solutions, as follows:

The present invention relates to a frame structure, which comprises: four subframes connected to a corresponding side of a back plate, respectively, and each having an inner side formed with at least one retaining part; retaining holes arranged on the side of the back plate and used to fix the corresponding subframe on the side by matching with corresponding retaining parts; and fixing parts arranged on a side of each of the subframes away from a body of the back plate; wherein the retaining part comprises a retaining portion and a connecting portion used to connect the inner side of the subframe to the retaining portion; wherein the retaining hole comprises a connecting hole which the retaining part passes through and a fixing hole which the connecting portion passes through and is connected to; and wherein the distance between the adjacent retaining parts is ranged from 10 to 15 cm.

The present invention further relates to a frame structure, which comprises: four subframes connected to a corresponding side of a back plate respectively and each having an inner side formed with at least one retaining part; retaining holes arranged on the side of the back plate and used to fix the corresponding subframe to the side by matching with corresponding retaining parts; and fixing parts arranged on a side of subframes away from a body of the back plate.

According to the frame structure of the present invention, the retaining part comprises a retaining portion and a connecting portion used to connect the inner side of the subframe to the retaining portion.

According to the frame structure of the present invention, the retaining hole comprises a connecting hole which the retaining part passes through and a fixing hole which the connecting portion passes through and is connected to.

According to the frame structure of the present invention, the profile of the retaining part is T-shaped, and the retaining hole is T-shaped.

According to the frame structure of the present invention, the profile of the retaining part is L-shaped, and the retaining hole is L-shaped.

According to the frame structure of the present invention, the distance between the adjacent retaining parts is ranged from 10 to 15 cm.

According to the frame structure of the present invention, the adjacent subframes are engaged with each other.

The present invention further relates to a backlight module, which comprises: a back plate; a light source arranged on the back plate and used to emit light; and a frame structure used to fix the light source on the back plate, comprising: four subframes connected to a corresponding side of a back plate respectively, and each having an inner side formed with at least one retaining part; retaining holes arranged on the side of the back plate and used to fix the corresponding subframe on the side by matching with the corresponding retaining parts; and fixing parts arranged on a side of subframes away from a body of the back plate.

According to the backlight module of the present invention, the retaining part comprises a retaining portion and a connecting portion used to connect the inner side of the subframe to the retaining portion.

According to the backlight module of the present invention, the retaining hole comprises a connecting hole which the retaining part passes through and a fixing hole which the connecting portion passes through and is connected to.

According to the backlight module of the present invention, the profile of the retaining part is T-shaped, and the retaining hole is T-shaped.

According to the backlight module of the present invention, the profile of the retaining part is L-shaped, and the retaining hole is L-shaped.

According to the backlight module of the present invention, the distance between the adjacent retaining parts is ranged from 10 to 15 cm.

According to the backlight module of the present invention, the adjacent subframes are engaged with each other.

Compared to the traditional frame structure and backlight module, the frame structure of the present invention need not a plenty of fasteners or screws to fix the subframe on the back plate. The frame structure can lower the production cost and enhance the assembly/disassembly efficiency. It solves the traditional problems of high manufacturing cost and low assembly/disassembly efficiency of the frame structure.

For the present invention described above will be more apparent, the following specific preferable embodiment with the companying drawings will be elaborated as follows:

DETAILED DESCRIPTION OF THE PREFERRED EMBODIMENTS

Figure 1:
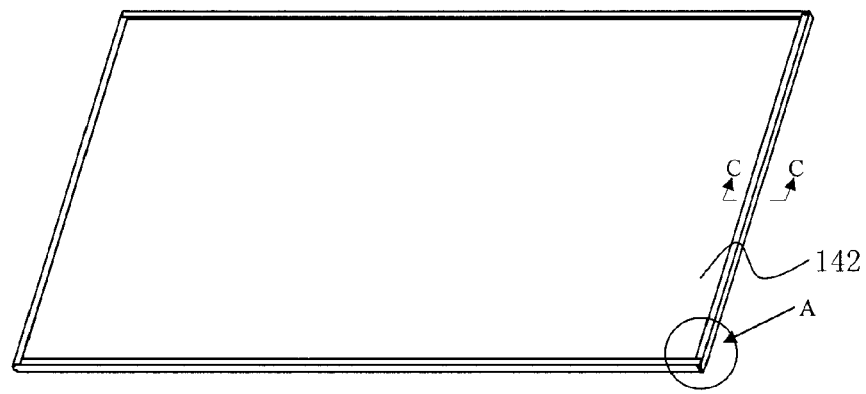
FIG. 1 is a structural schematic view of an assembled frame structure of the present invention.

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings. Thus, the used directional terms are used to describe and understand the present invention, but the present invention is not limited thereto.

In the figures, the similar structural unit is designated by the same reference numerals.

Figure 2:
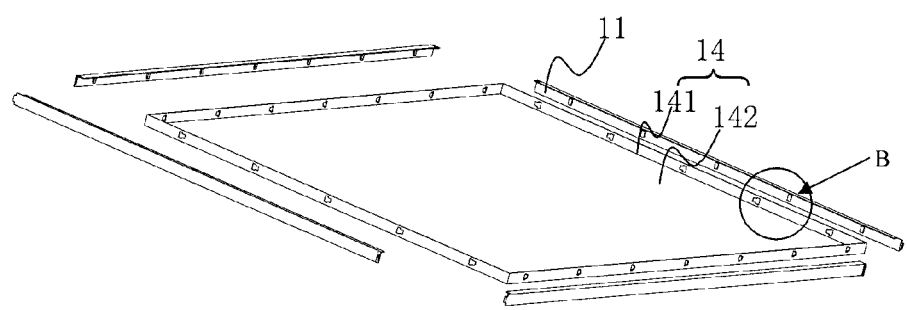
FIG. 2 is an exploded view according to a frame structure of the present invention.
Figure 3:
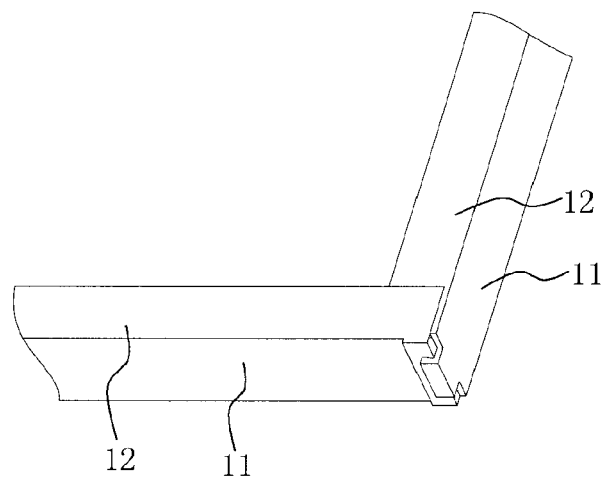
FIG. 3 is an enlarged structural schematic view of the part A in FIG. 1.
Figure 4A:
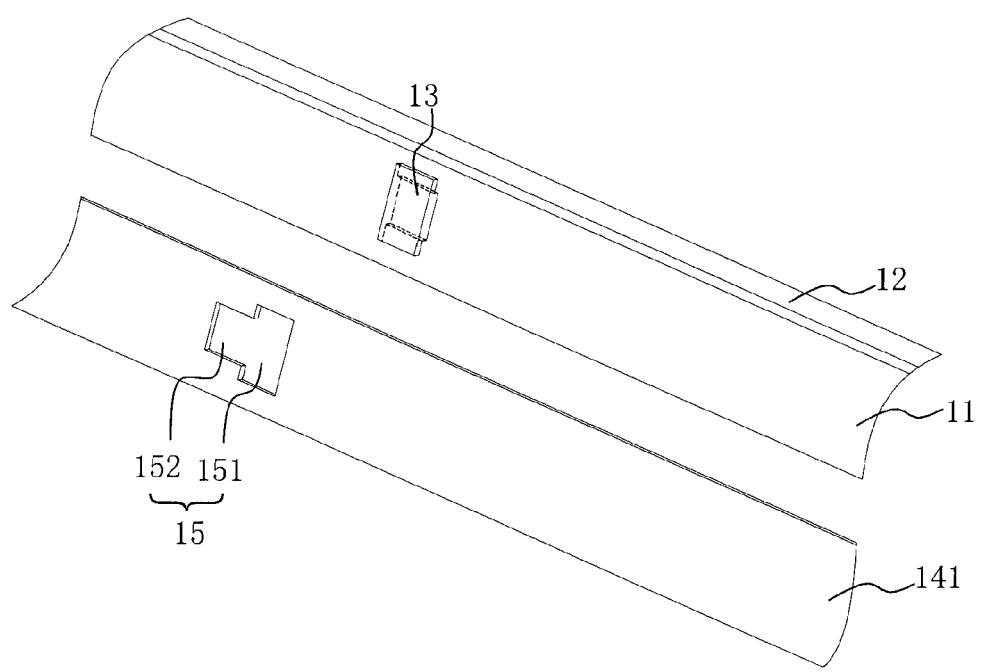
FIG. 4A is an enlarged structural schematic view of a first preferred embodiment of the frame structure in the present invention according to the part B in FIG. 2.
Figure 4B:
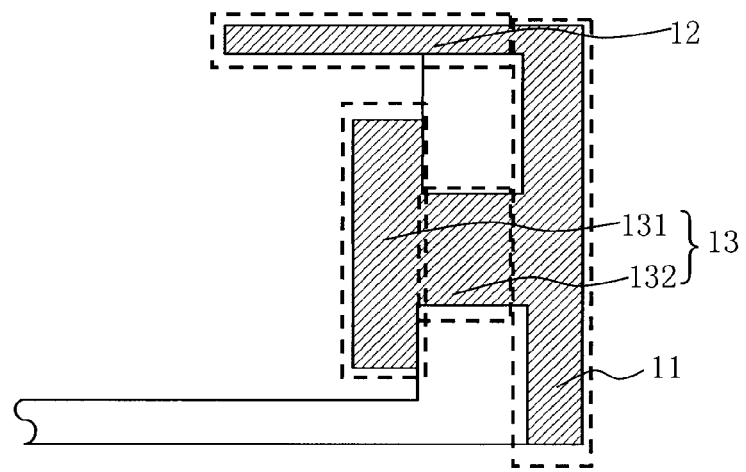
FIG. 4B is a structural schematic view of a cross section of the first preferred embodiment of the frame structure in the present invention, taken along the line C-C in FIG. 1.

Please refer to FIG. 1 to FIG. 4B. FIG. 1 is a structural schematic view of an assembled frame structure of the present invention; FIG. 2 is an exploded view according to a frame structure of the present invention; FIG. 3 is an enlarged structural schematic view of the part A in FIG. 1; FIG. 4A is an enlarged structural schematic view of a first preferred embodiment of the frame structure in the present invention according to the part B in FIG. 2; FIG. 4B is a structural schematic view of a cross section of the first preferred embodiment of the frame structure in the present invention, taken along the line C-C in FIG. 1. In this embodiment, the frame structure of the present invention comprises four subframes 11 and fixing parts 12 arranged on the subframes 11. Each subframe has an inner side formed with at least one retaining part 13, and a side 141 of a back plate 14 corresponding to the subframe 11 is arranged with a retaining hole 15; the retaining part 13 fixes the corresponding subframe 11 on the side 141 of the back plate by matching with the retaining hole 15; the back plate 14 comprises four sides around the back plate 14 and a body 142 positioned intermediately for mounting a light source and a light guide plate (if existing); the fixing part 12 of the frame structure is arranged on the side of the subframe 11 away from the body 142, so as to suitably fix the light source and the light guide plate on the body 142 of the back plate 14.

As shown in FIGS. 4A and 4B, the retaining part 13 comprises a retaining portion 131 and a connecting portion 132, wherein the connecting portion 132 is used to connect the inner side of the subframe 11 and the retaining portion 131. The retaining hole 15 comprises a connecting hole 151 and a fixing hole 152; the retaining part 13 (comprising the retaining portion 131 and the connecting portion 132) can pass through the connecting hole 151, and only the connecting portion 132 can pass through the fixing hole 152. The retaining portion 131 cannot pass through the fixing hole 152, so that it can fix the connecting portion 132 to the fixing hole 152. In this embodiment the profile of the retaining part 13 is T-shaped (as shown in FIG. 4B), and the retaining hole 15 is corresponding T-shaped as well (as shown in FIG. 4A). A plenty of retaining parts 13 can be arranged on the inner side of each subframe 11; meanwhile, a plenty of corresponding retaining holes 15 can also be arranged on the side 141 of the back plate 14. The distance between the adjacent retaining parts 13 is ranged from 10 to 15 cm, so that it can guarantee the reliability of the connection between the subframe 11 and the back plate 14. If the distance is too short, it will affect the assembly of the frame and increase the production cost; if the distance is too long, it will result in the gap between the subframe 11 and the side 141 of the back plate 14, and affect the reliability of the connection.

When applying to the frame structure of the present invention, as shown in FIG. 2, it is necessary to make sure that each side 141 of the back plate 14 corresponds to the subframe 11, and then arrange the portions such as the light source and the light guide plate on the back plate 14 to the corresponding position of the body 142 of the back plate 14 in turn. Subsequently, the corresponding subframe 11 is arranged on the side 141 of the back plate 14: each retaining part 13 on the inner side of the subframe 11 passes through the connecting hole 151 of the corresponding retaining hole 15 on the side 141 of the back plate 14; the subframe 11 is pushed along the direction of the length of the subframe 11, so that each connecting portion 132 of the retaining portion 13 positions to the fixing hole 152 of the corresponding retaining hole 15; because the retaining portion 131 of the retaining part 13 cannot pass through the fixing hole 152, the whole retaining part 13 compacts to the retaining hole 15 (that is, the size of the connecting portion 132 is slightly smaller than the size of the fixing hole 152). After the four subframes are mounted on the back plate 14, as shown in FIG. 3, the adjacent subframes 11 are engaged with each other by engagement portions and holes; meanwhile, the fixation of a certain subframe 11 causes all subframes 11 to be mounted on the sides 141 of the corresponding back plate 14. In this case the fixing part 12 can suitably fix the light source and the light guide plate on the body 142 of the back plate 14. When it is necessary to disassemble the frame structure from the back plate 14, it only needs to execute in a reverse method.

Figure 5A:
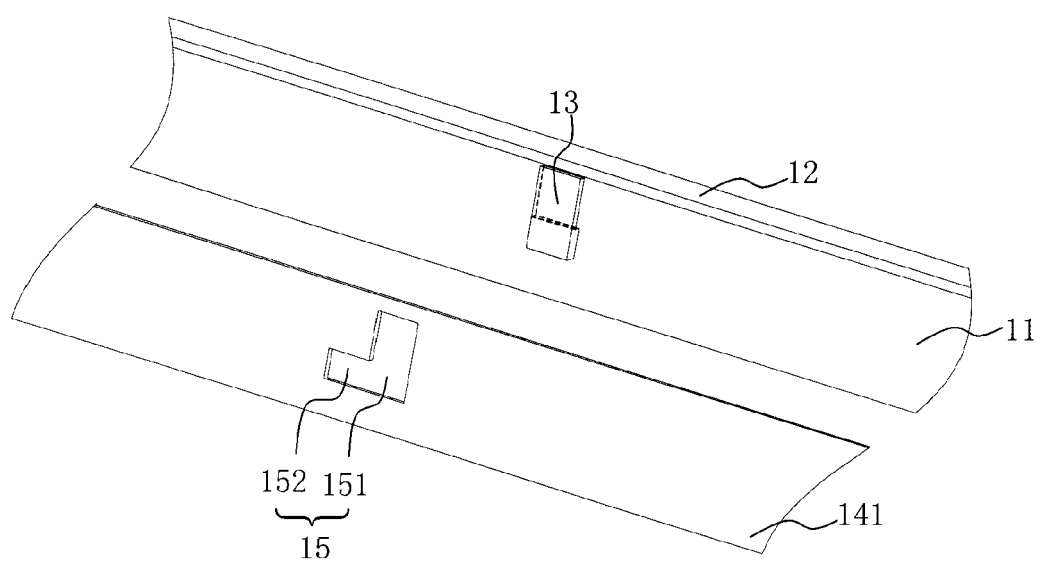
FIG. 5A is an enlarged structural schematic view of a second preferred embodiment of the frame structure in the present invention according to the part B in FIG. 2.
Figure 5B:
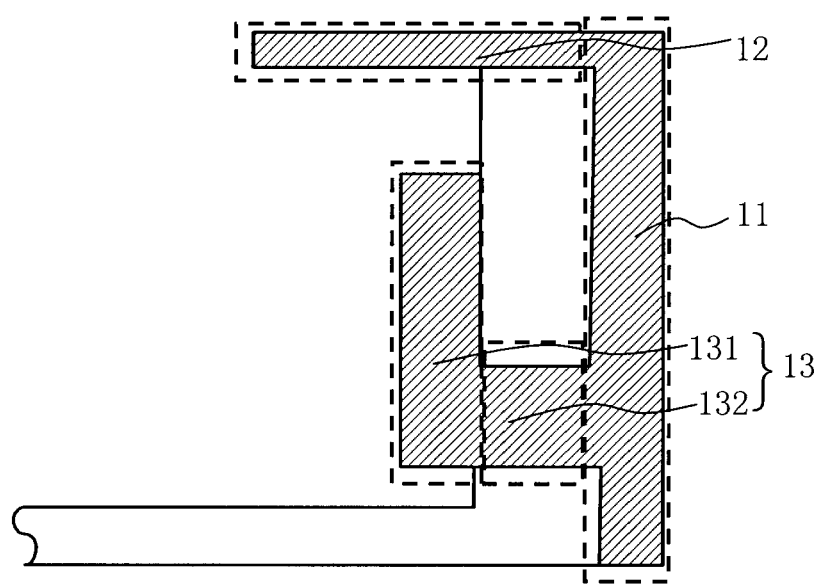
FIG. 5B is a structural schematic view of a cross section of the second preferred embodiment of the frame structure in the present invention, taken along the line C-C in FIG. 1.

As shown in FIGS. 1, 2, 5A and 5B, FIG. 5A is an enlarged structural schematic view of a second preferred embodiment of the frame structure in the present invention according to the part B in FIG. 2. FIG. 5B is a structural schematic view of a cross section of the second preferred embodiment of the frame structure in the present invention, taken along the line C-C in FIG. 1. The difference between this embodiment and the first preferred one is that: in this embodiment the profile of the retaining part 13 is L-shaped (as shown in FIG. 5B) and the retaining hole 15 is corresponding L-shaped as well (as shown in FIG. 5A). The specific installation of the frame structure and the beneficial effects are the same or similar to the first preferred embodiment; please refer to the relevant description of the frame structure according to the first preferred embodiment of the present invention.

The present invention further relates to a backlight module, wherein the backlight module comprises a back plate, a light source and a frame structure, the light source is arranged on the back plate and used to emit light; the frame structure is used to fix the light source on the back plate (if the backlight module comprises a light guide plate; meanwhile the light guide is fixed on the back plate). The frame structure of the present invention comprises four subframes and fixing parts arranged on the subframes. Each of the subframes has an inner side formed with at least one retaining part, and a side of the back plate corresponding to the subframe forms with a retaining hole; the retaining part fixes the corresponding subframe on the side of the back plate by matching with the retaining hole; the back plate comprises four sides around the back plate and a body positioned intermediately for mounting the light source and the light guide plate (if existing); the fixing part of the frame structure is arranged on the side of the subframe away from the body so as to suitably fix the light source and the light guide plate on the body of the back plate. The retaining part comprises a retaining portion and a connecting portion; wherein the connecting portion is used to connect the inner side of the subframe and the retaining portion. The retaining hole comprises a connecting hole and a fixing hole; the retaining part (comprising the retaining portion and the connecting portion) can pass through the connecting hole, and only the connecting portion can pass through the fixing hole. The retaining portion cannot pass through the fixing hole, so that it can fix the connecting portion to the fixing hole. The specific application and the beneficial effects of the present invention are the same or similar to the above-mentioned specific embodiment of the frame structure; please refer to the relevant description of the frame structure of the present invention.

According to the frame structure and the backlight module of the present invention, the retaining parts are arranged on the subframe and retaining holes are arranged on the corresponding positions of the back plate, wherein the subframe and the back plate connect to each other by matching the retaining part with the retaining hole, so that it does not need a plenty of fasteners and screws for fixing the subframe to the back plate, and further reduces the production cost and enhance the assembly/disassembly efficiency of the frame structure. Thus it solves the traditional problems of high manufacturing cost and low assembly/disassembly efficiency of the frame structure.

The present invention has been described with a preferred embodiment thereof and it is understood that many changes and modifications to the described embodiment can be carried out without departing from the scope and the spirit of the invention that is intended to be retained only by the appended claims.

What is claimed is:

1. A frame structure, comprising: four subframes connected to a corresponding side of a back plate, respectively, and each having an inner side facing the side of the back plate and formed with at least one retaining part; retaining holes arranged on the side of the back plate and fixing the corresponding subframe on the side of the back plate by matching with the corresponding retaining parts; and fixing parts arranged on a side of each of the subframes away from a body of the back plate; wherein the retaining part comprises a retaining portion and a connecting portion used to connect the inner side of the subframe to the retaining portion; wherein the retaining hole comprises a connecting hole which the retaining part passes through and a fixing hole which the connecting portion passes through to fixedly locate the side of the back plate between the retaining portion and the inner side of each of the subframes along a horizontal direction; and wherein the distance between the adjacent retaining parts is ranged from 10 to 15 cm.

2. A frame structure, comprising: four subframes connected to a corresponding side of a back plate respectively and each having an inner side facing the side of the back plate and formed with at least one retaining part; retaining holes arranged on the side of the back plate and fixing the corresponding subframe to the side of the back plate by matching with the corresponding retaining parts to fixedly locate the side of the back plate between a retaining portion and the inner side of each of the subframes along a horizontal direction; and fixing parts arranged on a side of each of the subframes away from a body of the back plate; wherein the retaining part comprises a retaining portion and a connecting portion used to connect the inner side of the subframe to the retaining portion, and the retaining hole comprises a connecting hole which the retaining part passes through and a fixing hole which the connecting portion passes through and is connected to.

3. The frame structure according to claim 2, wherein the profile of the retaining part is T-shaped, and the retaining hole is T-shaped.

4. The frame structure according to claim 2, wherein the profile of the retaining part is L-shaped, and the retaining hole is L-shaped.

5. The frame structure according to claim 2, wherein the distance between the adjacent retaining parts is ranged from 10 to 15 cm.

6. The frame structure according to claim 2, wherein the adjacent subframes are engaged with each other by engagement portions and holes.

7. A backlight module, comprising: a back plate; a light source arranged on the back plate and used to emit light; and a frame structure used to fix the light source on the back plate, and comprising: four subframes connected to a corresponding side of a back plate, respectively, and each having an inner side facing the side of the back plate and formed with at least one retaining part; retaining holes arranged on the side of the back plate and fixing the corresponding subframe on the side of the back plate by matching with the corresponding retaining parts to fixedly locate the side of the back plate between a retaining portion and the inner side of each of the subframes along a horizontal direction; and fixing parts arranged on a side of each of the subframes away from a body of the back plate; wherein the retaining part comprises a retaining portion and a connecting portion used to connect the inner side of the subframe to the retaining portion, and the retaining hole comprises a connecting hole which the retaining part passes through and a fixing hole which the connecting portion passes through and is connected to.

8. The backlight module according to claim 7, wherein the profile of the retaining part is T-shaped, and the retaining hole is T-shaped.

9. The backlight module according to claim 7, wherein the profile of the retaining part is L-shaped, and the retaining hole is L-shaped.

10. The backlight module according to claim 7, wherein the distance between the adjacent retaining parts is ranged from 10 to 15 cm.

11. The backlight module according to claim 7, wherein the adjacent subframes are engaged with each other by engagement portions and holes.

* * * * *